United States Patent
Bruening et al.

(10) Patent No.: US 7,856,531 B2
(45) Date of Patent: *Dec. 21, 2010

(54) ADAPTIVE CACHE SIZING BY UTILIZING REGENERATIVE ENTRIES

(75) Inventors: Derek L. Bruening, Troy, NY (US); Saman P. Amarasinghe, Waltham, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/345,768

(22) Filed: Dec. 30, 2008

(65) Prior Publication Data

US 2009/0204768 A1    Aug. 13, 2009

Related U.S. Application Data

(63) Continuation of application No. 11/356,599, filed on Feb. 17, 2006, now Pat. No. 7,478,218.

(60) Provisional application No. 60/654,557, filed on Feb. 18, 2005.

(51) Int. Cl.
*G06F 12/00* (2006.01)

(52) U.S. Cl. ............... 711/129; 711/133; 711/170
(58) Field of Classification Search ............ 711/129, 711/133, 170
See application file for complete search history.

(56) References Cited

U.S. PATENT DOCUMENTS

| 5,787,472 A * | 7/1998 | Dan et al. ............ 711/134 |
| 6,654,856 B2 * | 11/2003 | Frank ................ 711/133 |
| 6,865,647 B2 * | 3/2005 | Olarig et al. .......... 711/129 |
| 7,478,218 B2 * | 1/2009 | Bruening et al. ........ 711/170 |
| 2004/0193801 A1 * | 9/2004 | Benhase et al. ......... 711/118 |
| 2005/0102657 A1 * | 5/2005 | Lewis ................ 717/140 |
| 2007/0124540 A1 * | 5/2007 | van Riel .............. 711/133 |

* cited by examiner

*Primary Examiner*—Hong Kim

(57) ABSTRACT

A runtime code manipulation system is provided that supports code transformations on a program while it executes. The runtime code manipulation system uses code caching technology to provide efficient and comprehensive manipulation of an application running on an operating system and hardware. The code cache includes a system for automatically keeping the code cache at an appropriate size for the current working set of an application running.

26 Claims, 6 Drawing Sheets

```
fragment 7:    add %eax, %ecx
               cmp $4, %eax
               jle stub0
               jmp stub1
stub0:         mov %eax, eax-slot
               mov &dstub0, %eax
               jmp context_switch
stub1:         mov %eax, eax-slot
               mov &dstub1, %eax
               jmp context_switch
```

```
fragment 7:    add %eax, %ecx
               cmp $4, %eax
               jle fragment42
               jmp fragment8
stub0:         mov %eax, eax-slot
               mov &dstub0, %eax
               jmp context_switch
stub1:         mov %eax, eax-slot
               mov &dstub1, %eax
               jmp context_switch
```

Fig. 9A
Fig. 9B
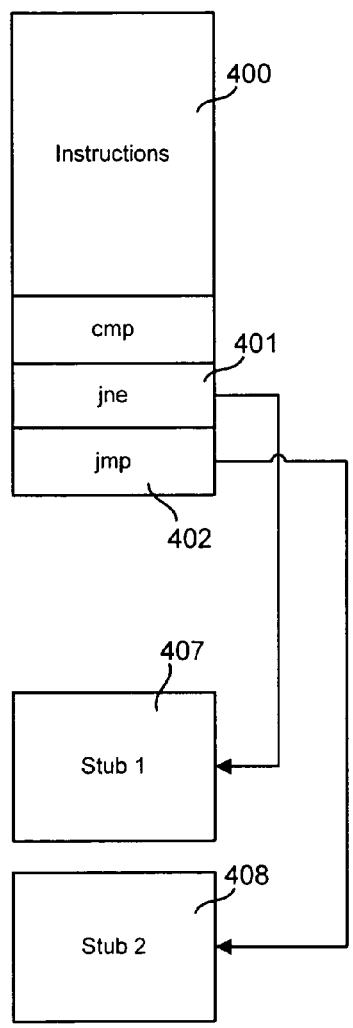
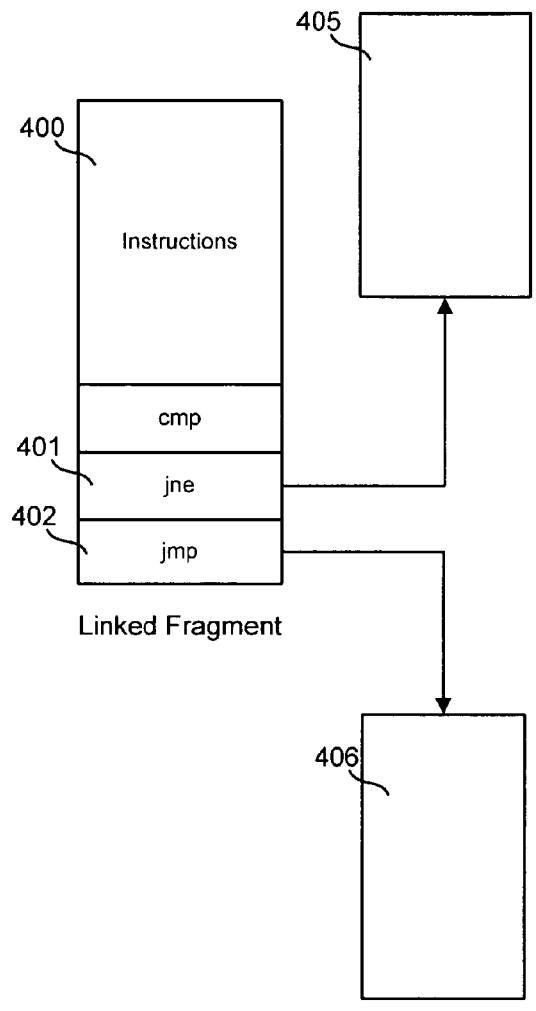

ADAPTIVE CACHE SIZING BY UTILIZING REGENERATIVE ENTRIES

CROSS REFERENCE TO RELATED APPLICATIONS

The present application is a continuation of U.S. patent application Ser. No. 11/356,599, entitled "Adaptive Cache Sizing", filed on Feb. 17, 2006, now issued as a U.S. Pat. No. 7,478,218, which claims benefit of U.S. Provisional Patent Application No. 60/654,557, entitled "A System for Managed Program Execution and Runtime Code Manipulation," by Derek L. Bruening, Vladimir L. Kiriansky, Timothy G. Garnett and Saman P. Amarasinghe, filed Feb. 18, 2005, and is incorporated by reference herein in its entirety.

STATEMENT REGARDING FEDERALLY SPONSORED RESEARCH

This invention was made with government support under Grant No. DABT63-96-C-0036, awarded by the Department of the Interior, Grant No. N66001-99-2-891702, awarded by the Navy, and Grant No. F29601-01-2-0166 awarded by the Air Force. The government has certain rights in the invention.

BACKGROUND OF THE INVENTION

As modern applications become larger, more complex, and more dynamic, building tools to manipulate these programs becomes increasingly difficult. At the same time the need for tools to manage applications grows. Information-gathering tools are needed for program analysis, introspection, and instrumentation to aid in software development, testing, debugging, and simulation. There is also a need for tools that modify programs for optimization, translation, compatibility, sandboxing, etc.

Many modern applications are assembled and defined at runtime, making use of shared libraries, virtual functions, plug-ins, dynamically-generated code, and other dynamic mechanisms. The amount of program information available statically is shrinking. Static tools have necessarily turned to feedback from profiling runs, but these provide only an estimate of program behavior. In many cases, the complete picture of a program's runtime behavior is only available at runtime.

Consider an important modern application, the web server. Today's web servers are built for extension by third-party code, in the form of dynamically-loaded modules (e.g., Internet Server Application Programming Interface (ISAPI) components used to provide dynamic data and capabilities for web sites). Even the designers of the web server programs cannot anticipate all of the third-party code that will be executed when the web server is in actual use.

Some runtime systems that gather information about or allow for manipulation of applications make use of a code cache implemented in software. Code is placed in the code cache so that it can be used for various purposes. When executing a single application in isolation, there may be no reason to limit the size of the code cache. However, when executing many programs simultaneously, memory usage can become problematic and can be reduced by imposing a bound on the size of the code cache. However, cache bounds come with a performance cost, and the trick is to pick the bound with the best space and performance tradeoff.

Many systems with a software code cache use a hard coded size limit. When the size limit is reached, the entire cache is flushed. The limit is set generously, and it is assumed that it will rarely be reached. This may work when executing a benchmark suite, but a generous hard coded size limit is not as well suited when targeting disparate applications like desktop programs.

SUMMARY OF THE INVENTION

A runtime code manipulation system is provided that supports code transformations on a program while it executes. The runtime code manipulation system uses code caching technology to provide efficient and comprehensive manipulation of an unmodified application running on an operating system and hardware. The code cache includes a system for automatically keeping the code cache at an appropriate size for the current working set of an application running.

One embodiment of a system for automatically changing the size of a cache comprises removing old entries in the cache using an eviction policy, inserting new entries in the cache, maintaining information about regenerated entries and replaced entries, and resizing the cache based on a function of the information about regenerated entries and replaced entries.

One embodiment of a system for automatically changing the size of a software code cache comprises removing an old code fragment from the software code cache based on an eviction policy and adding a new code fragment if the software code cache is full, maintaining a count of replaced code fragments in response to removing the old code fragment, determining whether the new code fragment is regenerated based on whether the new code fragment has previously been in the software code cache, maintaining a count of regenerated code fragments, and resizing the software code cache if a ratio of regenerated code fragments to replaced code fragments is beyond a certain threshold.

In one embodiment, one or more processor readable storage devices have processor readable code embodied on the processor readable storage devices, the processor readable code is for programming one or more processors to perform a method comprising removing an old entry from a cache using an eviction policy after the cache is full, adding a new entry to the cache, determining whether the new entry was previously in the cache, incrementing a count of regenerated entries if the new entry was previously in the cache and resizing the cache based on the count of regenerated entries and a number of removed entries.

One embodiment includes an apparatus capable of automatically changing the size of a cache. The apparatus comprises one or more storage devices, one or more communication interfaces, and one or more processors in communication with said one or more storage devices and said one or more communication interfaces. The one or more processors are programmed to perform a method comprising receiving a new entry to add to the cache, adding the new entry without evicting entries if the cache is not full, removing an old entry and adding the new entry if the cache is full, maintaining a count of removed entries, determining whether the new entry has previously been in the cache, incrementing a count of regenerated entries if the new entry has previously been in the cache, determining a ratio of regenerated entries to replaced entries, and resizing the cache if the ratio is beyond a certain threshold.

BRIEF DESCRIPTION OF THE DRAWINGS

FIGS. 9A and 9B depict a sample code cache fragment with separate exit stubs.

DETAILED DESCRIPTION

Figure 1:
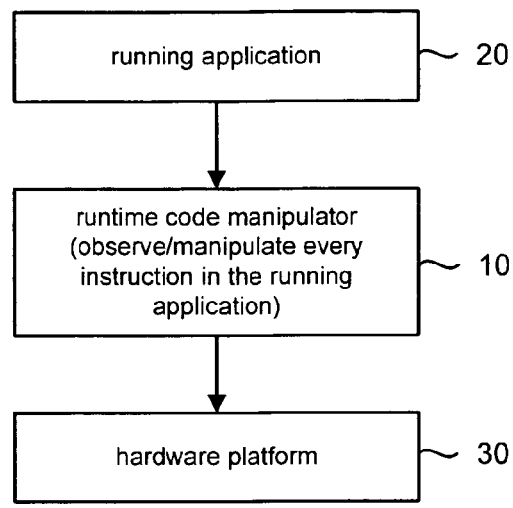
FIG. 1 is a block diagram depicting a runtime code manipulator with a running application and a hardware platform.

FIG. 1 depicts a Runtime Code Manipulator (RCM) 10, application 20 and platform 30. RCM 10 is a flexible software layer that comprehensively interposes itself between application 20 and the underlying platform 30. RCM 10 acts as a running control point, allowing custom tools to be embedded inside it.

RCM 10 allows code transformations on any part of a program while it executes. RCM 10 extends existing code caching technology to allow efficient, transparent, and comprehensive manipulation of an individual, unmodified application 20, running on a stock operating system and commodity hardware (platform 30).

Figure 2:
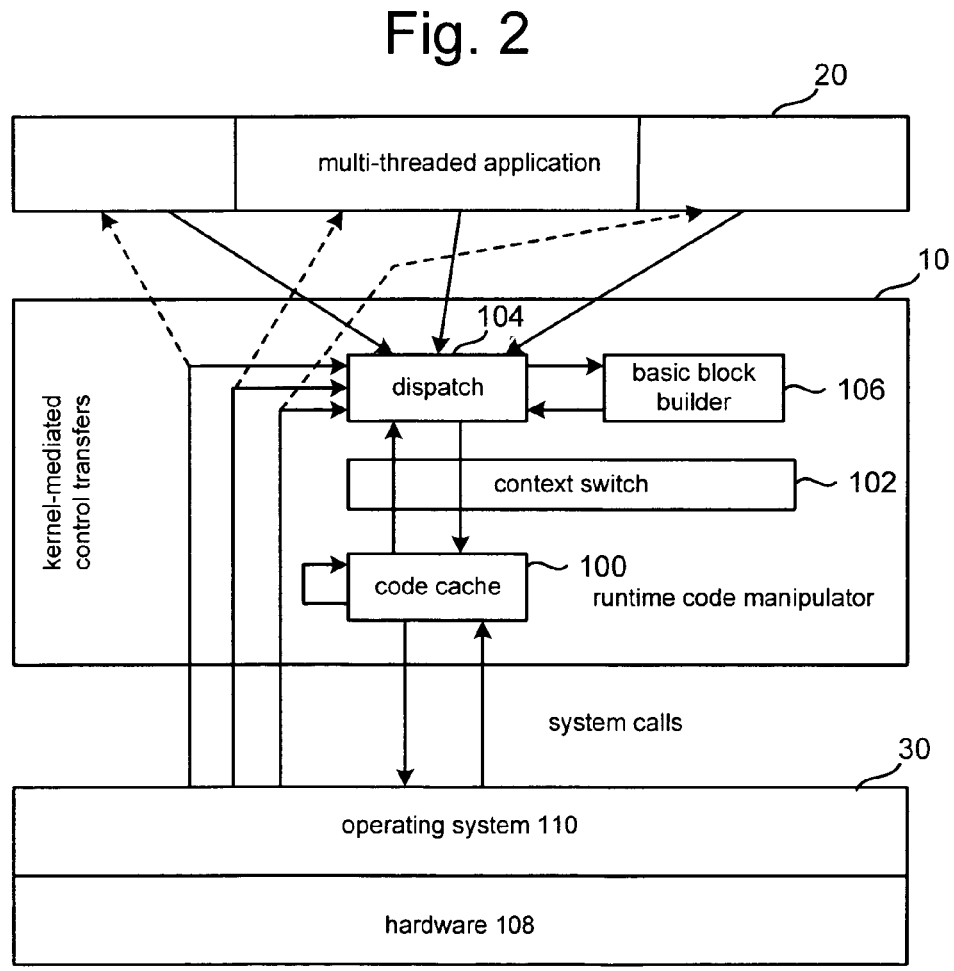
FIG. 2 is a block diagram depicting more detail of the runtime code manipulator with a running application and a hardware platform.

FIG. 2 illustrates the high-level design of RCM 10. FIG. 2 depicts RCM 10, including code cache 100, context switch 102, dispatch 104 and basic block builder 106. Platform 30 includes hardware 108 and operating system 110. Hardware platform 30 is in communication with code cache 100 and dispatch 104 in order to run application 20. Dispatch 104 communicates with code cache 100 via context switch 102. Dispatch 104 is also in communication with basic block builder 106 and application 20.

RCM 10 executes application 20 by copying the application code into code cache 100, one basic block at a time. Code cache 100 is entered via context switch 102 from RCM 10's dispatch state to that of the application. The cached code can then be executed natively, avoiding emulation overhead. However, shifting execution into code cache 10 that occupies the application's own address space complicates transparency. One lesson is that RCM 10 should be fully transparent and avoid affecting the behavior of the program it is executing.

In one embodiment, in order to reach the widest possible set of applications (to be universal and practical), RCM 10 targets the most common architecture, IA-32 (a.k.a. ×86), and the most popular operating systems on that architecture, Windows and Linux (both of which are examples of operating system 110 depicted in FIG. 2). The efficiency of a runtime code manipulation system depends on the characteristics of the underlying hardware, and the Complex Instruction Set Computer (CISC) design of IA-32 requires a significant effort to achieve efficiency. To be universal, RCM 10 must handle dynamically-loaded, generated, and even modified code. Every write to application code must be detected, and system calls that load or unload shared libraries must be monitored. Further challenges arise because RCM 10 resides on top of operating system 110; for example, multiple threads complicate its cache management. In some embodiment, RCM 10 can dynamically bind its code cache size to be deployable on production systems without disturbing other programs on the same machine by exhausting memory resources.

Figures 3, 4:
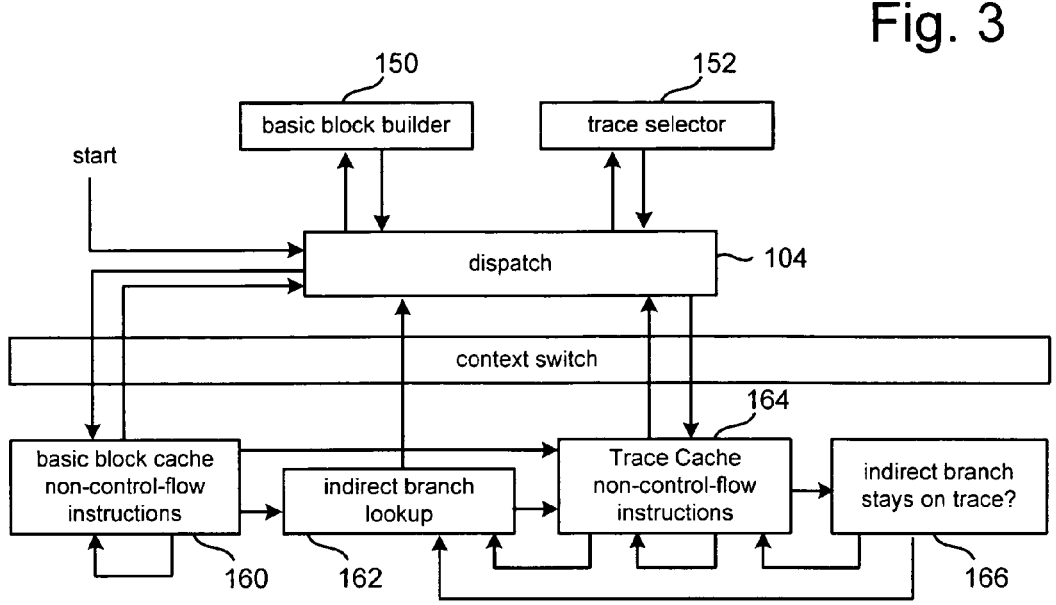
FIG. 3 depicts the runtime code manipulator.
FIG. 4 depicts sample code.

RCM 10 is able to observe and manipulate every application instruction prior to its execution by building upon known techniques of code caching, linking, and trace building. FIG. 3 shows the components of RCM 10 and the flow of operation between them. FIG. 3 depicts dispatch 104 in communication with basic block builder 150, trace selector 152, basic block cache 160, indirect branch lookup 162 (via context switch 102) and Trace Cache non-control-flow instructions 174 (via context switch 102). "Indirect Branch Stays on Trace 166" connects to Trace Cache non-control-flow instructions 174, indirect branch lookup 162, and itself. Trace cache 164 and basic block cache 160 also loop to themselves. The process starts at dispatch 104. Context switch 102 separates the code cache from RCM 10 code (though it all executes in the same process and address space). Application code is copied into the two caches, with control transfers (shown by arrows in the figure) modified in order to retain control.

FIG. 3 concentrates on the flow of control in and out of the code cache 100, which is the bottom portion of the figure. The cached application code looks just like the original code with the exception of its control transfer instructions, which are shown with arrows in the figure, and which must be modified to ensure that RCM 10 retains control. RCM 10 populates the code cache one basic block at a time and then links the blocks together. The code cache enables native execution to replace emulation, bringing performance down from a several hundred times slowdown for pure emulation. Linking of direct branches reduces slowdown further, to around three times native performance. Adding in indirect branch linking, by using a fast lookup of the variable indirect branch target, pushes that performance further, down under two times. One twist on linking is to separate the stubs of code required for the unlinked case from the code for the block itself. Further performance gains are achieved by building traces in a slightly different manner from other systems, and by a novel scheme of eliding unconditional control transfers when building basic blocks.

RCM 10 copies application code into its code cache in units of basic blocks, which are sequences of instructions ending with a single control transfer instruction. A typical basic block consists of six or seven instructions taking up twenty or thirty bytes, although some blocks can be quite large, in the thousands of bytes. FIG. 4 shows an example basic block from an application. FIG. 4 shows an example basic block consisting of three IA-32 instructions: an add, a compare, and a conditional direct branch. RCM 10's basic blocks are different from the traditional static analysis notion of basic blocks. RCM 10 considers each entry point to begin a new basic block, and follows it until a control transfer is reached, even if it duplicates the tail of an existing basic block. This is for simplicity of code discovery. Unlike static analyzers, RCM 10 does not have the luxury of examining an entire code unit such as a procedure. At runtime such information may not be available, nor is there time to spend analyzing it.

Figures 5A, 5B, 6:
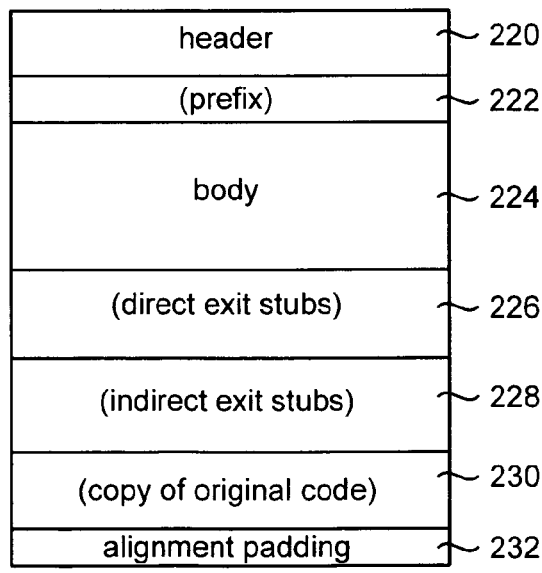
FIGS. 5A and 5B depict sample code.
FIG. 6 is a block diagram depicting one embodiment of a fragment.

The application's code is executed by transferring control to corresponding basic blocks in the code cache. At the end of each block, the application's machine state is saved and control returned to RCM 10 (a context switch) to copy the next basic block. FIG. 5A shows what the example block looks like inside of RCM 10's code cache. Before the targets of its exits have materialized in the cache, they point to two exit stubs (stub0 and stub1). Each stub records a pointer to a stub-specific data structure so RCM 10 can determine which exit was taken. At first glance, putting the second stub first seems like an optimization to remove the jump targeting it, but RCM 10 uses that jump for linking, and it is not worth optimizing for the rare unlinked case. Each exit stub records a pointer to its own data structure (dstub0 or dstub1) before transferring control to the context switch, so that RCM 10 can figure out which branch was taken. The pointer is stored in a register that first needs to be spilled because this two-instruction combination is more efficient than a ten-byte (slowly-decoded) store of the pointer directly to memory.

Copying each basic block into a code cache and executing it natively reduces the performance hit of interpretation. However, RCM 10 is still interpreting each control transfer by going back to find the target. If the target is already present in the code cache, and is targeted via a direct branch, RCM 10 can link the two blocks together with a direct jump, avoiding the cost of a subsequent context switch. FIG. 5B shows how the exit stubs of the example block of FIGS. 4 and 5A are bypassed completely after linking. For example, the "jle" instruction references fragment 42 rather than stub0 and the "jmp" instruction references fragment 8 instead of stub1. The performance improvement of linking direct control transfers is dramatic as expensive context switches are replaced with single jumps.

Linking may be done either proactively, when a fragment is created, or lazily, when an exit is taken. Proactive linking is a better choice for IA-32. In either case, data structures must be kept to record the outgoing links of each fragment. The incoming links must also be kept, in order to efficiently delete a single fragment: otherwise, all other fragments must be searched to make sure all links to the dead fragment are removed, or alternatively space must be wasted with a placeholder in the dead fragment's place. Single-fragment deletion is important for cache consistency. Incoming link records are also required to quickly shift links from one fragment to another for things like trace head status changes or replacing a fragment with a new version of itself. Incoming links to non-existent fragments must be stored as well, for which RCM 10 use a future fragment data structure as a placeholder. Once an actual fragment at that target is built, it replaces the future fragment and takes over its incoming link list. Future fragments can also be used to keep persistent state across fragment deletions and re-creations, such as for cache capacity and trace head counters.

RCM 10 is able to undo linking on demand, for building traces, bounding time delay of delivering signals, fragment replacement, and when deleting a fragment. Unlinking requires either incoming link information or using a prefix on each fragment. RCM 10 uses incoming link information, as it is already needed for proactive linking and other features.

The actual process of linking and unlinking boils down to modifying the exits of a fragment. Examining FIG. 5A and its unlinked version FIG. 5B shows that each branch exiting a fragment either points to its corresponding exit stub (the unlinked state) or points to its actual fragment target (the linked state). Switching from one state to the other on IA-32 takes a single 32-bit store, which, if the targets do not straddle cache lines or if the lock prefix is used, is atomic on all recent IA-32 processors and thus can be performed in the presence of multiple threads without synchronization.

Once an exit from a basic block is linked, the corresponding exit stub is not needed again unless the exit is later unlinked. By locating the exit stubs in a separate cache from the basic block body, RCM 10 can delete and re-create exit stubs on demand as they are needed. This both compacts the cache, reducing the working set size of the program, and reduces overall memory usage by deleting stubs no longer needed.

Indirect branches cannot be linked in the same way as direct branches because their targets may vary. To maintain transparency, original program addresses must be used wherever the application stores indirect branch targets (for example, return addresses for function calls). These addresses must be translated to their corresponding code cache addresses in order to jump to the target code. This translation is performed as a fast hash table lookup inside the code cache (avoiding a context switch back to RCM 10).

To improve the efficiency of indirect branches, and to achieve better code layout, basic blocks that are frequently executed in sequence are stitched together into a unit called a trace. The superior code layout and inter-block branch elimination in traces provide a significant performance boost. One of the biggest benefits of traces is in avoiding indirect branch lookups by inlining a popular target of an indirect branch into a trace (with a check to ensure that the actual target stays on the trace, falling back on the full lookup when the check fails). This explains why their biggest impact is often on benchmarks with many indirect branches.

Trace building is also used as a hardware instruction fetch optimization and the Pentium 4 contains a hardware trace cache. Although the Pentium 4 hardware trace cache stitches together IA-32 micro-operations, it is targeting branch removal just like a software trace cache, and there is some competition between the two. The hardware cache has a smaller window of operation, but its effects are noticeable.

The NET trace creation scheme is specifically designed for low-overhead, incremental use. Despite its simplicity, it has been shown to identify traces with comparable quality to more sophisticated schemes. NET operates by associating a counter with each trace head. A trace head is either the target of a backward branch (targeting loops) or an exit from an existing trace (called a secondary trace head). The counter is incremented on each execution of the trace head. Once the counter exceeds a threshold (usually a small number such as fifty), trace creation mode is entered. The next executing tail (NET) is taken to be the hot path. This means that the next sequence of basic blocks that is executed after the trace head becomes hot is concatenated together to become a new trace. The trace is terminated when it reaches a backward branch or another trace or trace head.

RCM 10 modifies NET to not consider a backward indirect branch target to be a trace head. Consequently, where NET would stop trace creation at a backward indirect branch, RCM 10 continues. This has both an advantage and a disadvantage. The advantage is that more indirect branches will be inlined into traces, where with the NET scheme, half of the time a trace will stop at an indirect branch. The disadvantage is that in pathological situations (e.g., a recursive loop where the recursive call is indirect) unlimited loop unrolling can occur. The advantage is worth the extra unrolling, and a maximum trace size limits potential code bloat.

In one embodiment it is noted that more trace heads do not result in better traces. Since trace creation stops upon reaching a trace head (to avoid code duplication), more trace heads can result in many tiny traces. By selectively eliminating trace heads that are targets of indirect branches, RCM 10 tries to build traces across those branches. However, RCM 10's trace building scheme does do poorly in some extreme cases. An example is a threaded interpreter, where indirect branches are used almost exclusively, causing RCM 10 to build no traces.

An average trace consists of four basic blocks, about 29 instructions. More than one in two traces contains an inlined indirect branch, one of the goals of trace building. Traces reduce RCM 10's indirect branch translation overhead significantly.

To increment the counter associated with each trace head, the simplest solution is to never link any fragment to a trace head, and perform the increment inside RCM 10. As there will never be more than a small number of increments before the head is turned into a trace, this is not much of a performance hit. Another strategy is to place the increment inside the trace head fragment itself. However, this requires replacing the old fragment code once the fragment is discovered to be a trace head (which often happens after the fragment is already in the code cache, when a later backward branch is found to target it). The cost of replacing the fragment overwhelms the performance improvement from having the increment inlined (remember, the increment only occurs a small number of times—RCM 10's default is fifty). A different strategy is to use a shared routine inside the cache to perform the increment. When discovering that a fragment is a trace head, all fragments pointing to it can be changed to instead link to the increment routine. This link change is most easily done when incoming links are recorded. The increment routine increments the counter for the target trace head and then performs an indirect branch to the trace head's code cache entry point. Since a register must be spilled to transfer information between the calling fragment and the increment routine, the routine needs to restore that register, while keeping the indirect branch target available. Only two options allow both: storing the indirect branch target in memory, or adding a prefix to all potential trace heads (all basic blocks, unless blocks are replaced once they are marked as trace heads, which is expensive) that will restore the register containing the target to its application value. RCM 10 stores the target in memory, though this has ramifications for self-protection. Incrementing the counter without leaving the code cache drastically reduces the number of exits from the cache.

Indirect branches targeting trace heads present some complications. For the first increment method of not linking to trace heads, the hash table(s) used for indirect branches must not contain trace heads at all, to avoid directly targeting a trace head and skipping its counter increment. The most straightforward way is to use two separate hashtables, one for basic blocks and one for traces, with only the trace hash table being consulted when resolving an indirect branch. However, this can result in terrible performance on programs with pathological trace building problems, such as the threaded interpreters mentioned above, since basic blocks will never be indirectly linked to other basic blocks. One solution is to use a different hash table for basic block indirect branch lookup that contains both non-trace-head basic blocks and traces, but that requires support for fragments to exist in multiple hash tables simultaneously. A simpler solution that preserves a one-hashtable-per-fragment invariant is to have two disjoint hashtables: one that contains trace heads and one that contains all non-trace heads, both traces and basic blocks. For the second increment method, the indirect branch lookup routine must be modified to check whether its target is a trace head. If so, it should transfer control to the shared increment routine and pass it a pointer to the target fragment.

To avoid losing the trace head count due to eviction of the trace head from the cache for capacity reasons, it is best to use persistent trace head counters. When a trace head is deleted, its count can be stored in the future fragment data structure used to store incoming links for a deleted or not-yet-created fragment. Once the trace head is re-created, the existing count can be transferred so that it does not start at zero. Persistent trace head counters are important for maintaining trace building progress, and thus performance, when the basic block cache size is limited.

Once a trace head's counter exceeds the trace threshold, a new trace is built by executing basic blocks one at a time. Each block's outgoing exits are unlinked, so that after execution it will come back to RCM 10 in order to have the subsequent block added to the trace. Each block is marked as un-deletable as well, to avoid a capacity miss that happens to evict this particular block from ruining the trace being built. After being copied into the trace-in-progress and being executed to find the subsequent basic block, the current block is re-linked and marked as deletable again. Then the next block is unlinked and the process repeats. Once the subsequent block is known, if the just-executed block ends in a conditional branch or indirect branch, that branch is inlined into the trace. For a conditional branch, the condition is reversed if necessary to have the fall-through branch direction keep control on the trace. The taken branch exits the trace. For an indirect branch, a check is inserted comparing the actual target of the branch with the target that will keep it on the trace. If the check fails, the trace is exited.

Once a trace is built, all basic blocks targeted by its outgoing exits automatically become secondary trace heads. This ensures that multiple hot tails of a trace head will all become traces. The trace head that caused trace creation is removed from the code cache, as its execution is replaced by the new trace. The shape of basic blocks has a large impact on trace creation because it changes the trace heads.

Traces and basic blocks are treated in the same manner once they are copied to the cache. The term fragment is used to refer to either a basic block or a trace in the code cache. Both types of fragment are single-entry, multiple-exit, linear sequences of instructions.

One example of a layout of a fragment in the code cache is depicted in FIG. 6. Header 220 includes four bytes used to point to the Fragment data structure corresponding to the fragment in that cache slot, for traversing the physical order of fragments in the cache. For an empty fragment slot, the header points to an Empty Slot (see empty slot 310 of FIG. 7) data structure, and the subsequent fields are absent. Prefix 222 is the prefix code for the fragment used to optimize transfer of control from RCM 10's indirect branch lookup routine by shifting state restoration to the target, where registers and condition codes may not need to be restored if they are not live. Body 224 is the code for the body of the fragment. Direct Exit Stubs 226 includes the code for any direct exit stubs. It is best to relocate these and combine them all in a separate area, but they can also be located immediately after the fragment body. Indirect Exit Stubs 228 includes the code for any indirect exit stubs. The Copy of Original Application Code 230 is used to store a copy of the original code for use when handling self-modifying code. Alignment Padding 232 is added to a fragment slot to achieve better cache line and word alignment. Padding is added to the end of a fragment, so the beginning becomes aligned only due to the padding added to the previous fragment. In one embodiment, Prefix 222, Direct Exit Stubs 226, Indirect Exit Stubs 228 and the Copy of Original Application Code 230 are optional.

A simple optimization may be performed when an unconditional jump or call instruction is encountered while building a basic block. Instead of stopping the block at the control transfer, it can be elided and the block continued at its target, which is statically known. This is an initial step toward building traces. Eliding unconditional control transfers provides a code layout benefit. However, it leads to duplicated code if the unconditional target is also targeted by other branches, since those other targets will build a separate basic block. If there are few such duplications, however, eliding unconditionals can result in less memory use because there are fewer basic blocks and therefore fewer corresponding data structures. It has been found that the performance and memory impact of eliding unconditionals varies significantly by application.

Care must be taken to maintain application transparency when eliding unconditionals. If the target is invalid memory, or results in an infinite loop, the basic block builder should not prematurely trigger that condition. RCM 10 checks the target of the branch to see if it will result in a read fault (at the same time that RCM 10 checks its memory region for cache consistency purposes). A maximum basic block size is used.

Eliding unconditionals impacts trace building, since eliding backward unconditionals changes which blocks will become trace heads. The SPEC CPU 2000 benchmark apsi is particularly sensitive to eliding. It has basic blocks that are joined by backward unconditional jumps. If RCM 10 does not elide such a jump, the second block will be its own trace head, and RCM 10 will never end up placing the two blocks adjacent to each other, since traces always stop upon meeting other traces or trace heads. If RCM 10 does elide the jump, the second block will not be a trace head, but RCM 10 will have achieved superior code layout. Not considering a backward unconditional jump to mark trace heads could make a difference, but the second block is often also targeted by a backward conditional jump. Eliding has an additional impact on building traces at call sites. When not eliding, a single basic block will represent the entrance of a callee. This makes it more difficult to create call-site-specific traces that cross into the callee. Eliding can enable the creation of more specific traces by ensuring that a trace that reaches the call site also reaches into the callee.

RCM 10 should avoid interfering with the semantics of a program while it executes. RCM 10 should translate every machine context that the operating system hands to the application, to pretend that the context was originally saved in the application code rather than the code cache. This happens in exception and signal handlers. Additionally, Windows provides a GetThreadContext Win32 API routine, and a corresponding system call, that enables one thread to obtain the context of another thread. RCM 10 intercepts this call and translates the context so that the target thread appears to be executing natively instead of in the code cache. Context translation takes several steps, each bringing the code cache context closer to the state it would contain natively. The first step is translating the program counter from the code cache to its corresponding application address. One option is to store a mapping table for each fragment. RCM 10's approach, to save memory, is to re-create the fragment from application code, keeping track of the original address of each instruction, and then correlating the code cache address to the address pointed at in the reconstruction at the same point in the fragment. Since RCM 10's cache consistency management ensures that the original application code cannot have changed since building a fragment, RCM 10 only needs to store the starting address of a basic block, and the starting addresses of each block making up a trace. RCM 10 then rebuilds the fragment as though it were encountering new code, making sure to store the original address of each instruction. If this is a trace, RCM 10 rebuilds each constituent block. Finally, RCM 10 walks through the reproduction and the code cache fragment in lockstep, until it reaches the target point in the code cache fragment. The application address pointed at by the corresponding instruction in the reconstructed fragment is the program counter translation. The second step is ensuring that the registers contain the proper values.

Context translation can be limited to only controlled points outside of the code cache, and points inside where a fault can arise. In the absence of optimizations and other code transformations, only inserted code for indirect branches cause problems here (the load of the indirect branch target could fail). In this case several registers must have their application values restored to complete the translation.

RCM 10 does not currently restore register values in the presence of optimizations. Full translation for RCM 10 is simpler than for systems that are interrupted at arbitrary times with events that cannot be delayed. These systems must be built to roll back or forward to a clean state from any location, not just at the few code transformation points of our base system (without optimizations).

Any system that caches copies of application code must ensure that each copy is consistent with the original version in application memory. The original copy might change due to dynamic modification of the code or de-allocation of memory, e.g., the unmapping of a file containing the code, such as a shared library. Unmapping of files is relatively frequent in large Windows applications, which load and unload shared libraries with surprising frequency. On most architectures, software must issue explicit requests to clear the instruction cache when modifying code, facilitating the tracking of application code changes. In contrast, IA-32 keeps the instruction cache consistent in hardware, making every write to memory a potential code modification. While applications that dynamically modify code are rare, on Windows the loader modifies code sections for rebinding and rebasing (Windows shared libraries do not use position-independent code). Furthermore, re-use of the same memory region for repeated dynamic generation of code must be treated as code modification. Finally, actual self-modifying code is seen in a few applications, such as Adobe Premiere and games like Doom.

Memory unmapping that affects code is nearly always unloading of shared libraries, but any file unmap or heap de-allocation can contain code. Unmapping is a relatively simple problem to solve, as it, like instruction cache consistency on other architectures, involves explicit requests to the kernel. RCM 10 need only watch for the system calls that unmap files or free areas of the address space. On Linux, these are munmap and mremap; on Windows, NtUnmapViewOfSection, NtFreeVirtualMemory, and NtFreeUserPhysicalPages. When RCM 10 see such a call, RCM 10 must flush all fragments that contain pieces of code from that region. RCM 10 use the same flushing scheme as for responding to memory modification.

Unlike memory unmapping, the application does not need to issue an explicit request when writing to code. Therefore, RCM 10 must monitor all memory writes to detect those that affect code. This can be done by instrumenting each write or by using hardware page protection. Page protection provides better performance since there is no cost in the common case of no memory modifications, in contrast to the always-present overhead of instrumentation.

RCM 10's cache consistency invariant is this: to avoid executing stale code, every application region that is represented in the code cache must either be read-only or have its code cache fragments sandboxed to check for modifications. RCM 10 keeps an executable list of all memory regions that have been marked read-only or sandboxed and are thus allowed to be executed. The list is initially populated with memory regions marked executable but not writable when RCM 10 takes control. Both the Windows and Linux executable formats mark code pages as read-only, so for the common case all code begins on our executable list. The list is updated as regions are allocated and de-allocated through system calls (RCM 10 does not track intra-process memory allocations through calls like malloc).

When execution reaches a region not on the executable list, the region is added, but if it is not already read-only, RCM 10 marks it read-only. If a read-only region is written to, RCM 10 traps the fault, flushes the code for that region from the code cache, removes the region from the executable list, marks the region as writable, and then re-executes the faulting write.

For error transparency, RCM 10 must distinguish write faults due to page protection changes from those that would occur natively. When RCM 10 receives a write fault targeting an area of memory that the application thinks is writable, that fault is guaranteed to belong to RCM 10, but all other faults must be routed to the application. Additionally, RCM 10 must intercept Windows' Query VirtualMemory system call and modify the information it returns to pretend that appropriate areas are writable. If the application changes the protection on a region RCM 10 has marked read-only, RCM 10 must update its information so that a later write fault will properly go to the application.

Memory modification also occurs with trampolines used for nested function closures, which are often placed on the stack. As the stack is unwound and re-wound, the same address may be used for a different trampoline later in the program. RCM 10 invalidates the first trampoline when it is written to, whether by subsequent use of the stack for data or generation of a later trampoline. Additionally, the Windows loader directly modifies code in shared libraries for rebasing. The loader also modifies the Import Address Table for rebinding a shared library, and this table is often kept in the first page of the code section. This means that modifications of the table look like code modifications if the entire section is treated as one region. It is difficult to determine whether a perceived code modification is being performed by the loader or not without knowing the internal data structures of the loader itself.

Read-only code pages do not work when the writing instruction and the target are on the same page (or same region, if regions are larger than a page). These situations may involve actual self-modifying code (such as in Adobe Premiere) or false sharing (writes to data near code, or generation of code near existing code). Marking code pages as read-only also fails when the code is on the Windows stack, for reasons explained below.

To make forward progress when the writer and the target are in the same region, RCM 10 marks the region as writable and uses sandboxing. One strategy is for each fragment from a writable region to verify only that its own code is not stale, by storing a copy of its source application code. At the top of the fragment a check is inserted comparing the current application code with the stored copy, which must be done one byte at a time—comparing a hash is not good enough as a code modification could end up not changing the hash. If the code copy is different, the fragment is exited and immediately flushed. If the check passes, the body of the fragment is executed, but with an added check after each memory write to detect whether code later in the fragment is being modified. If any of these checks fails, RCM 10 again exits the fragment and immediately flushes it. In either flushing case, RCM 10 removes only the fragment in question from the cache. This technique incurs a sizable space penalty for sandboxed fragments, as they store a copy of the original application code and instrumentation code at the beginning and after each write. Even though IA-32 processors from the Pentium onward correctly handle modifying the next instruction, Intel strongly recommends executing a branch or serializing instruction prior to executing newly modified code, but RCM 10 cannot rely on this.

Unlike UNIX operating systems, Windows does not support an alternate exception handling stack. If an exception occurs while the stack pointer is pointing to invalid or unwritable memory, the process is silently killed. Control does not reach user mode at all, as the kernel kills the process when it fails to store arguments for the exception dispatcher on the user stack, and the application has no means of recovery. Thus, RCM 10 cannot mark any stack region as read-only, as a resulting write fault will kill the process. When RCM 10 adds a code region on the stack to the executable list, instead of marking it read-only RCM 10 marks it for sandboxing. To identify the stack, RCM 10 considers both the current stack pointer and the thread's initial assigned stack, although the stack pointer could change at any time, spelling disaster if it later points to memory RCM 10 made read-only. This is a pathological case, the intersection of two rare events: stack pointer region changes and writable code regions. Future work could address this by watching writes to the stack pointer (optimizing checks for the common writes of stack pushes and pops), which should have a relatively low overhead.

Sandboxing may be a better general choice than making pages read-only for cases of false sharing, where many writes to data on the same page can be more expensive with page protection than the cost of sandboxing the code, depending on how frequently executed the code is.

For utilizing page protection, regions must be at least as large as pages, though they can be smaller for sandboxing. If regions are too large, a single code modification will flush many fragments, which is expensive. On the other hand, small regions create a longer executable list and potentially many more protection system calls to mark code as read-only. Large regions work well when code is not being modified, but small regions are more flexible when small pieces of scattered code are being occasionally modified. When regions are frequently modified, sandboxing may be best choice. Another consideration is the pattern of code modification. If code modification and subsequent execution are two separate phases, large regions are best. But, if code is modified and immediately executed, repeatedly, small regions are good for separating the writer from the target and avoiding unnecessary flushing.

RCM 10 uses an adaptive region granularity to fit regions to the current pattern of code modification. RCM 10's initial region definition is a maximal contiguous sequence of pages that have equivalent protection attributes. Since nearly all code regions are read-only to begin with and are never written to, these large regions work well. On a write to a read-only region containing code, RCM 10 splits that region into three pieces: the page being written (which has its fragments flushed and is marked writable and removed from our executable list), and the regions on either side of that page, which stay read-only and executable. If the writing instruction is on the same page as the target, RCM 10 marks the page as self-modifying. RCM 10's executable list merges adjacent regions with the same properties (the same protection privileges, and whether self-modifying), resulting in an adaptive split-and-merge strategy that maintains large regions where little code is being modified and small regions in heavily written-to areas of the address space.

RCM 10 could also mark a page as self-modifying if it is written to more times than executed from. As mentioned in the previous section, self-modifying code is the best choice for a page primarily used for data that has a few pieces of rarely-executed code on it.

Whatever region sizes RCM 10 uses, RCM 10 must be able to map a region to a list of fragments in the code cache containing code from that region. Since RCM 10 elides unconditional control transfers, even a basic block might contain code from several widely separated regions.

Before mapping a region to fragments, a check that the region actually contains code that has been executed saves unnecessary work. Since RCM 10 must worry about code being removed on any unmapping, many potential flushes are only a data file being unmapped. RCM 10 tests for any overlap between the unmap region and the list of executable regions. Another optimization, for thread-private caches, is to store a list of executed-from memory regions for each thread, which can be quickly consulted to determinate whether a thread needs to have any of its fragments flushed.

Once these initial region overlap checks indicate that there are fragments to flush, RCM 10 must identify the fragments in the target region. RCM 10 stores a list of fragments with each executable list region entry (for thread-private caches, with the thread-private executable list entries). To save memory RCM 10 embeds linked list pointers in the fragment data structure itself and use it as the entry in the first region that a fragment touches. Separate dedicated data structures called MultiEntry are placed in the fragment list for each additional region the fragment occupies, with all entries for a single fragment chained together in a separate linked list that crosses the region lists. These lists are set up when a basic block or a trace is created, with each new page encountered, either through eliding an unconditional or simply walking off the edge of the previous page, triggering a potential addition of a new region. With these per-region fragment lists, flushing simply walks the list of fragments that must be flushed, and ignores all other fragments. This ties flushing to the region granularity on the executable list, as RCM 10 must flush an entire region at a time. Still, this is an improvement over most other systems which flush their entire caches on any cache consistency event.

Even when using thread-private code caches, a memory unmapping or code modification affects all threads' caches, since they share the same address space. This is the one operation on thread-private caches that requires synchronization.

On IA-32, to support all applications, RCM 10 must follow sequential consistency. To do so requires immediate invalidation of all affected fragments from the code cache of every thread. Otherwise, stale code could be executed. Because any code could be modified at any time, and there is no efficient mechanism to identify where a thread is inside the code cache to the granularity of a fragment, the only way to do this is to use a brute-force approach: suspend all threads and forcibly move those that are executing inside of to-be-invalidated code. Threads may have legitimate reasons to be executing inside of a to-be-deleted region, as that region may contain data that was written to instead of code (false sharing). No thread can be resumed until the target code is not reachable inside the code cache. If writes to code regions are frequent, suspending all threads is too heavyweight of a solution.

RCM 10 distinguishes between code and data. In one embodiment RCM 10 only needs to worry about consistency of code. The key observation is that ensuring that no thread enters a stale fragment can be separated from the actual removal of the fragment from the cache. The first step can be done atomically with respect to threads in the code cache by unlinking the target fragments and removing them from the indirect branch lookup table(s). The actual deletion of the fragments can be delayed until a safe point when all threads in question have left the code cache on their own. This prevents any new execution of stale code, leaving only the problem of handling a thread currently inside of a stale fragment. Here RCM 10 turn to the relaxed consistency model. If the application is properly synchronized, and every application synchronization operation terminates its containing fragment, then RCM 10 can always let a thread finish executing a to-be-deleted fragment without actually executing stale code in a manner that could not occur natively. For example, if thread A modifies some code, then thread B cannot legitimately execute the newly modified code until it has synchronized with A, which requires exiting its current fragment. If all stale fragments are unlinked, then B will not be able to enter or re-enter any stale fragment after the synchronization operation. This consistency model is essentially sequential consistency when only considering data or only considering code, but weak consistency when considering all of memory. Code writes will never be seen out of order, and of course data writes are not affected at all. The only re-ordering with respect to sequential consistency that might occur is between a data write and a code write.

This consistency relaxation matches the limitations of our self-modifying sandboxing, which employs a check at the top of each fragment, rather than unlinking, to bound the stale code window to a single fragment body. If RCM 10 could identify all application synchronization operations and never build fragments across them, neither the consistency model relaxation nor the sandboxing method would break any application in a way that could not occur natively. However, RCM 10 cannot efficiently identify all possible synchronization operations. For example, an implicitly atomic single-word operation can be used as a condition variable, and RCM 10 cannot afford to break fragments on every memory access on the chance that it might be a condition variable. Fortunately, for synchronizing more than two threads, an explicitly atomic operation that locks the memory bus (using the lock prefix or the xchg instruction) is required. Thus, if RCM 10 breaks fragments at such instructions, RCM 10 should be safe for all but certain two-thread-only synchronization code.

The cases that do break the model are pathological, involving one thread waiting for another to write to code before executing it. Given that Intel discourages executing modified code without a branch or serializing instruction first, the implementation can be relaxed further, only breaking fragments on loops and system calls, and still catch the vast majority of synchronization cases since synchronization is usually separate enough from any transition to modified code that it should be in a separate fragment. The only violating case is a trace (since it must inline a conditional branch) that reads a condition variable prior to jumping to some target code, with another thread setting that condition variable after modifying the code. Not building traces that bridge compiled code modules and generated code regions further narrows the window in which stale code can be executed.

To implement non-precise flushing that allows a delay between the flush and the actual deletion of the flushed fragments, RCM 10 must accomplish only one thing at the time of the flush: prevent any new executions of the targeted fragments. This requires unlinking and removing them from the indirect branch lookup table. RCM 10 then adds the region being flushed to a queue of to-be-deleted fragments, for deletion when the code cache is free of threads. With this unlinking strategy, atomic unlinking is required even with thread-private code caches. Our linking is designed to be a single write, which can be made atomic by aligning it to not straddle a cache line boundary, or by using the lock prefix. The hashtable removal must also be safe to be done while another thread is examining the table from the code cache, which may incur a performance impact for thread-shared caches.

Even for the unlinking stage, RCM 10 must synchronize with each thread. One synchronization model centers around whether a thread might be reading or modifying linking information, memory region information, or trace information for the fragments in question, or not. For the most part this boils down to whether the thread is in the code cache or in RCM 10 code, but there are some exceptions, such as most system call handlers, which consist of RCM 10 code but do not access linking information.

The thread that is performing the flush sets a flag to prevent new threads from being created or old threads from dying and then marches through the thread list, checking whether each thread is accessing link information or not. The majority of threads are in the code cache, and thus not accessing link information, but if one is, the flusher must set a flag and wait for the thread to reach a non-linking state. For thread-shared caches, all threads must by synchronized with simultaneously before acting on the target fragments, while thread-private caches require only one thread at a time. Once the target thread(s) are at a safe point, the flusher checks whether they have any fragments in the flush region, and if so, it unlinks them and removes them from the hashtable, adding them to a queue of to-be-deleted fragments. As each thread in the code cache (only one for thread-private, of course) exits, it checks the queue and if it is the last thread out performs the actual deletion of the fragments. Thread-shared caches can use a barrier preventing re-entry to bound the time until all threads exit the cache, or periodically suspend all threads (with a low frequency this technique can perform well—it is when forced to use it on every consistency event that suspension performance is problematic).

Other caching systems either do not support threads or use the brute-force suspend-all-threads algorithm for any fragment deletion. These systems often do not fully handle cache consistency, and so only perform deletions on rarer cache capacity events. Consistency events are much more common in programs that use dynamically-generated code, and a more efficient solution, like ours, is needed.

Cache consistency has a significant impact on general cache management. Arbitrary fragments can be invalidated at any time, leading to holes in the cache, which complicate multi-fragment deletion. Deleting in batches is ordinarily more efficient, since a contiguous group can be deleted at once, and if memory unmappings were the only type of consistency event this would work well, as batch deletion groups could be organized to match code regions. But memory modification events result in fine-grained fragment invalidation, and a fragment invalidation that occurs in the middle of a batch region requires either evicting the entire batch or splitting it up. The existence of numerous memory modification events in modern, dynamic applications makes single-fragment deletion the best choice for thread-private caches, for which it can be efficiently performed.

Consistency holes in the code cache are often scattered, causing fragmentation. If no capacity policy or fragmentation solution is in place to fill in these holes rather than adding to the cache, repeated cache consistency events can end up causing unlimited growth of the code cache. The next discussion describes cache capacity management for RCM 10.

For executing a single application in isolation, there may be no reason to limit the code cache size. However, when executing many programs under RCM 10 simultaneously, memory usage can become problematic. RCM 10 can reduce memory usage by imposing a bound on the code cache size. Additionally, cache consistency fragment invalidations can cause unbounded cache growth in the absence of a fragmentation solution. Of course, cache bounds come with a performance cost, and one goal is to pick the bound with the best space and time tradeoff. Two problems must be solved: how to set an upper limit on the cache size, and how to choose which fragments to evict when that limit is reached. Unlike a hardware cache, a software code cache can be variable-sized. This flexibility makes it possible to tailor a different upper limit for each application, and for that limit to change as the application moves through different phases.

Many systems with a software code cache use a hardcoded size limit, and when it is reached, the entire cache is flushed. The limit is set generously, and it is assumed that it will rarely be reached. This may work when executing a benchmark suite, but when targeting disparate applications like desktop programs, the value of a cache adaptively sized for the application at hand is apparent. Different programs run vastly different amounts of code, and a single program's code cache needs may change during its execution.

Whatever limit is placed on the size of the code cache, a policy is needed to decide which fragments to evict to make room for new fragments once the size limit is reached. Hardware caches typically use a least-recently-used (LRU) eviction policy, but even the minimal profiling needed to calculate the LRU metric is too expensive to use in software. RCM 10 uses a least-recently-created, or first-in-first-out (FIFO), eviction policy, which allows it to treat the code cache as a circular buffer and avoid any profiling overhead from trying to identify infrequently-used fragments.

Figure 7:
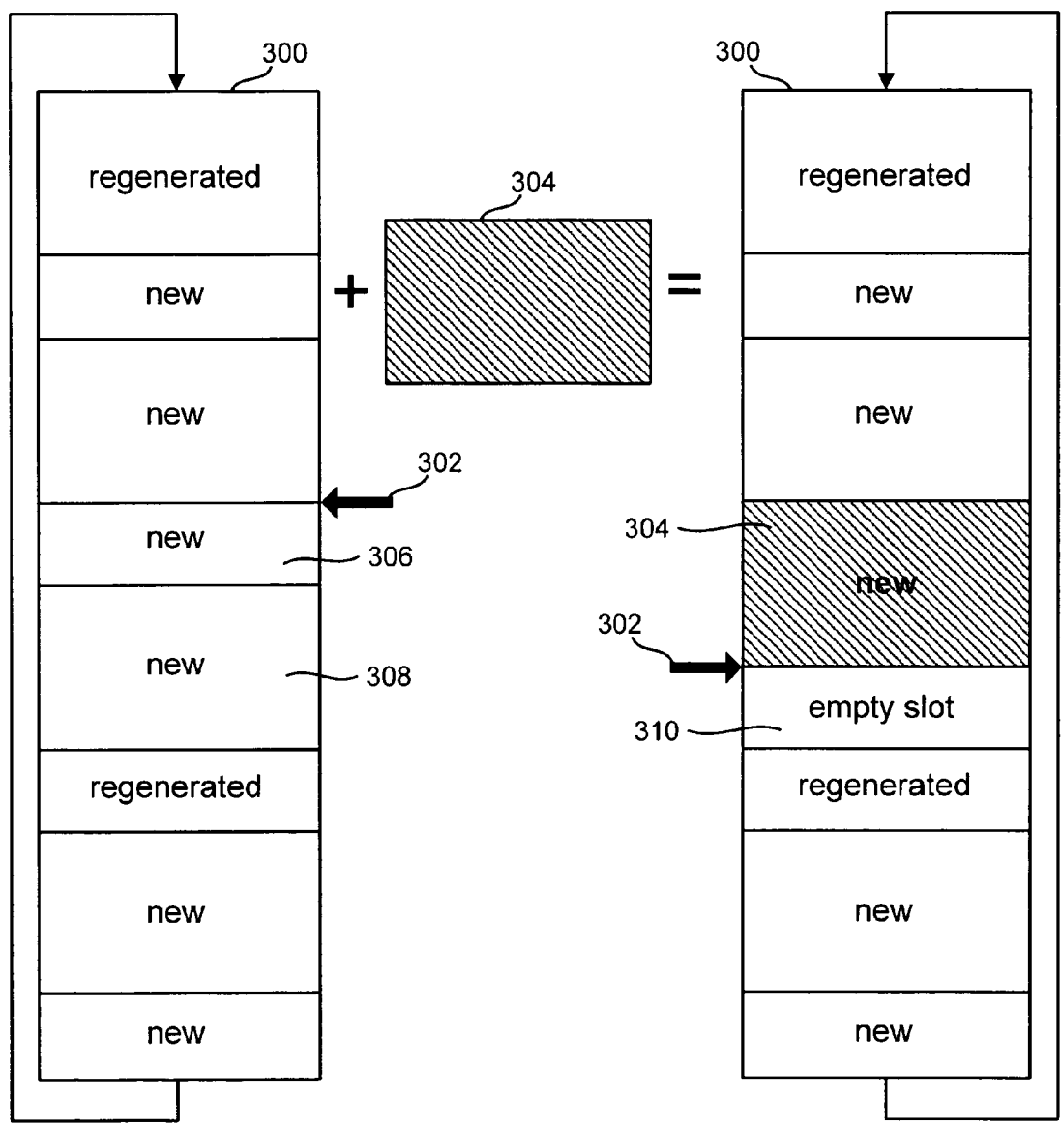
FIG. 7 is a block diagram depicting a fragment eviction policy.

FIG. 7 illustrates RCM 10's FIFO replacement policy. The cache is depicted as a circular buffer 300 containing a set of fragments (marked as either new or regenerated), with a new fragment added at the current head (pointed to by pointer 302). FIG. 7 shows a new fragment 304 being added to circular buffer 300.

To make room for a new fragment (e.g., new fragment 304) when the cache is full, one or more contiguous fragments (e.g., fragments 306 and 308) at the current point in the FIFO are deleted. This requires single-fragment deletion, which RCM 10 already must support for cache consistency. If undeletable fragments are encountered (for example, from trace building), the current FIFO point skips over them and the process repeats with a new target victim until enough contiguous space is found for the fragment being added. If there is empty space (e.g., empty slot 310) after deleting fragments to make room for a new fragment (due to differences in fragment size), that space will be used when the next fragment is added—that is, the FIFO pointer points at the start of the empty space. By deleting adjacent fragments and moving in a sequential, FIFO order, fragmentation of the cache from capacity eviction is avoided.

Two other sources of cache fragmentation are deletion of trace heads as each trace is built and cache consistency evictions. To combat these types of fragmentation, RCM 10 uses empty slot promotion. When a fragment is deleted from the cache for a non-capacity reason, the resulting empty slot is promoted to the front of the FIFO list and will be filled with the next fragment added to the cache. To support empty slot promotion RCM 10 must use a logical separation of the FIFO from the actual cache address order. Logical separation is also useful for treating multiple memory allocations as a single cache.

Independent of other factors, deleting groups of fragments all at once for cache capacity has better performance than single-fragment deletion. However, cache consistency events on modern applications are frequent enough that only supporting large deletions would empty the cache. Furthermore, using single-fragment deletions for consistency thwarts any batch flushing used for capacity, as batch flushing requires groups of fragments to form single allocation and de-allocation units with no individual members deleted separately, and any fragment may be invalidated at any time for consistency reasons.

RCM 10 has a new scheme for automatically keeping the code cache at an appropriate size for the current working set of the application. In addition to removing requirements for user input to set cache sizes, the dynamically adjusted limit allows for applications with phased behavior that will not work well with any hard coded limit. The method for determining when to resize a cache could be applied to a simple one-cache setup or to each cache in a generational cache system. Generational caches move frequently-used fragments to successively later caches while earlier generations are replaced by new code. While they may be useful for separating valuable code by adding more layers than RCM 10's basic blocks and traces, they require continuous profiling that can be detrimental in a runtime system and do not solve the working set sizing problem as they still require a sizing scheme for each cache.

Figure 8:
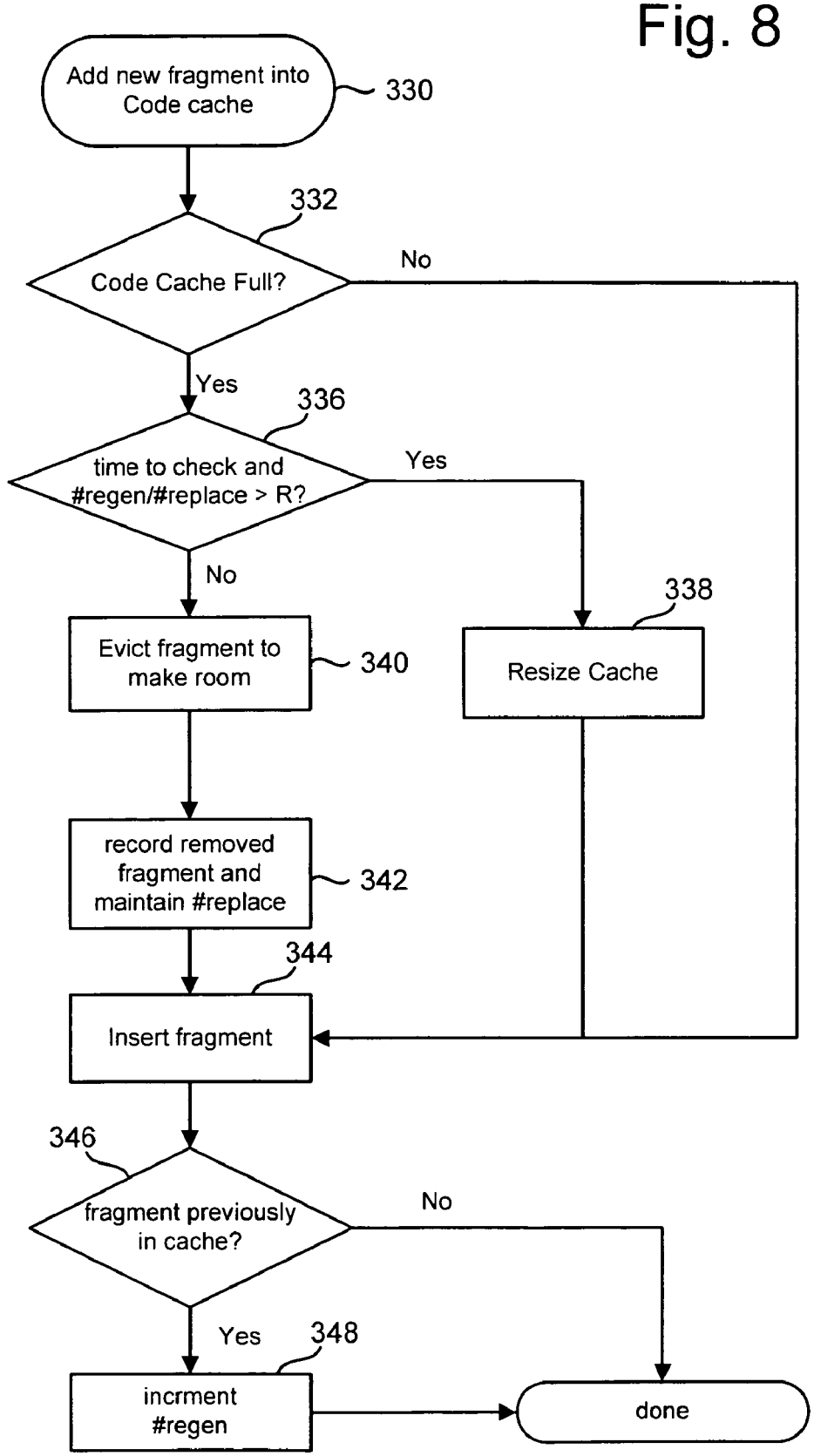
FIG. 8 is a flow chart describing one embodiment of a process of adding a code fragment into the code cache and changing the size of the code cache.

FIG. 8 is a flow chart describing a process for automatically changing the size of a cache, which is performed when adding a new fragment to the cache (see 330 of FIG. 8). The automatic resizing of the cache is based on measuring the ratio of regenerated fragments (#regen of FIG. 8) to replaced fragments (#replace of FIG. 8). RCM 10 begins with a small cache. Before the cache fills up (step 332), fragments are added (step 344) without resizing. Once the cache fills up (step 332), RCM 10 incorporates new fragments by removing old fragments using an eviction policy (step 340). One example of a suitable eviction policy is a first-in, first-out policy that avoids expensive profiling and utilizes single-fragment deletion. RCM 10 records every fragment that RCM 10 removes from the cache by setting a flag in the data structure used for proactive linking (which contains information on all fragments, whether currently in the cache or not) and RCM 10 maintains the count of replaced fragments (#replace) by incrementing the count for each fragment removed (step 342). When RCM 10 adds a new fragment (step 344 of FIG. 8), RCM 10 checks to see whether it was previously in the cache (step 346). If so, RCM 10 increments the count (#regen) of regenerated fragments (step 348). FIG. 7 illustrates the marking of fragments as new or regenerated.

If a significant portion of new fragments are regenerated, the cache should be larger than it is. This is tested by determining whether the ratio of #regen/#replace is greater than a certain threshold R (step 336). If so, RCM 10 allows the cache to be resized (step 338). Otherwise, the cache remains at its present size. The checks are in RCM 10 code and incur no cost while execution is in the code cache. As the working set changes, RCM 10 will replace the old fragments with new fragments.

In one embodiment, the determining of whether the ratio of (#regen/#replace) is greater than a certain threshold (R) is performed periodically.

Fifty is an example of a value to use for the replaced fragment count (#replace). That is, in one embodiment RCM 10 will check the regenerated count (#regen) and the ratio once every fifty fragments that are replaced in the cache. Checking too frequently is too easily influenced by temporary spikes, and too rarely is not reactive enough. One strategy is to average things out a bit but not be too sluggish in resizing. The goal is to identify the proper cache size to hold the working set of the application.

An additional idea is to shrink the cache when the working set shrinks, which is much more difficult to detect than when it grows. Size increases are driven by application requests, while size decreases must be driven by RCM 10 via some type of periodic interrupt in order to guarantee that the cache will shrink for a now-idle thread. Such interrupts are problematic on Windows without either a dedicated RCM 10 thread or a RCM 10 component that lives in kernel space. Explicit application actions like unloading libraries that imply reductions in code could also be used to drive cache shrinkage.

Resizing the cache by allocating a larger region and re-locating the existing one is expensive, as it requires updating all control transfers that exit the cache (direct branches are program-counter-relative on IA-32). To provide more efficient and more flexible cache scalability, the cache is divided into units, each of which can be a different size. Asking for more space allocates a new unit, leaving existing units alone. Each unit is allocated directly from the operating system using the mmap system call on Linux and NtAllocateVirtualMemory on Windows. Cache units are separate from memory parceled out by the heap manager because of their large size.

RCM 10 uses thread-private code caches, where each thread has its own private basic block cache and trace cache, which are each composed of separate units. Since these units are thread-private, no synchronization is required when accessing them. Freed units (e.g., on thread death) are either placed on a free list for use by future threads or released back to the operating system, according to a heuristic that keeps the free list at a size proportional to the number of threads (RCM 10 keeps at most max(5, num_threads/4) free units at any one time).

Adding a level of indirection between the list of fragments in the cache and the actual layout of the cache units is suggested for keeping the cache manageable. RCM 10 has two methods of iterating over fragments in the cache, one by physical order within each cache unit and the other by the logical order used for cache management (FIFO order). This separate logical list uses its level of indirection to build a higher abstraction than cache units and physical placements, facilitating the use of multiple cache units with different sizes to represent a single logical code cache, as well as allowing cache management orders different from the strict cache address order (e.g., empty slot promotion).

The physical ordering is only required for freeing contiguous space in the cache. A four-byte header 220 at the top of each fragment slot is used to point to the Fragment data structure corresponding to the fragment slot. To walk forward on the physical list, the total fragment size is added to the current header location to produce the location of the next header. For the logical list, next and previous pointers in the Fragment data structure are used to chain fragments into a double-linked list. Each empty slot in the cache (these occur when a fragment is deleted from the middle of the cache) lives on the logical list as an EmptySlot structure, pointed to by the empty slot's cache header.

Once an exit from a basic block is linked, the corresponding exit stub is not needed again unless the exit is later unlinked. By locating the exit stubs in a separate cache from the basic block body, RCM 10 can delete and re-create exit stubs on demand as they are needed. This both compacts the cache, reducing the working set size of the program, and reduces overall memory usage by deleting stubs no longer needed.

By allocating the direct exits stubs in a separate location, RCM 10 can compact the rest of the cache. Furthermore, once a direct exit is linked up to its target, the stub can be deleted, since it is not needed. If that exit becomes unlinked later, a new stub can be allocated on demand. The stub needs to be kept around for certain cases, such as incrementing a target trace head counter without leaving the cache or for certain types of profiling. RCM 10 does use stubs to increment trace head counters, but can still delete about half of all direct exit stubs. Indirect stubs are always needed and can never be deleted. They could be separated, but since they are much rarer the working set compaction would be less, and, more importantly, the critical indirect branch lookup performance might suffer.

FIGS. 9A and 9B illustrate a fragment 400 in both an unlinked state (FIG. 9A) and a linked state (FIG. 9A). Exit stubs 407 and 408 are located in a separate location from the fragment 400. Fragment 400 contains two direct exits 401 and 402. In the unlinked state (FIG. 9A) exit 401 targets exit stub 407 while exit 402 targets exit stub 408. In the linked state (FIG. 9B), exit 401 targets another fragment 405 while exit 402 targets a different fragment 406. In the linked state the separate exit stubs 407 and 408 are freed and do not occupy space.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method for automatically changing the size of a cache, comprising:
    removing old entries in said cache using an eviction policy;
    inserting new entries in said cache;
    maintaining information about regenerated entries and removed old entries; and resizing said cache based on a function of said information about the regenerated entries and the removed old entries, wherein the regenerated entries are ones of the new entries that were previously removed from the cache.

2. The method of claim 1, wherein said maintaining said information includes determining a ratio of said regenerated entries to said removed old entries; and
    resizing said cache includes resizing said cache if said ratio satisfies a certain threshold.

3. The method of claim 2, wherein said determining a ratio is performed periodically.

4. The method of claim 2, wherein said determining a ratio is performed after a predetermined number of entries have been replaced.

5. The method of claim 1, further comprising recording the old entries removed from said cache.

6. The method of claim 5, wherein said recording the old entries includes setting a flag in a data structure which contains information about the old entries.

7. The method of claim 1, wherein said removed old entries and said new entries are code fragments.

8. The method of claim 2, wherein said eviction policy is a first-in, first out policy.

9. The method of claim 2, wherein said new entries replace said removed old entries.

10. The method of claim 2, wherein said removing the old entries is performed after said cache is full.

11. The method of claim 2, wherein said cache is a software code cache.

12. The method of claim 11, wherein:
    said method further includes recording the removed old entries from said cache;
    said recording the removed old entries includes setting said flag in a data structure which contains information on entries;
    said removed old entries and said new entries are code fragments;
    said eviction policy is a first-in, first out policy;
    said removing old entries is performed after said cache is full;
    said maintaining information includes determining a ratio of regenerated entries to replaced entries; and
    said resizing said cache includes resizing said cache if said ratio satisfies a certain threshold.

13. A method for automatically changing the size of a software code cache, comprising:
    removing an old code fragment from said software code cache based on an eviction policy and adding a new code fragment if said software code cache is full;
    maintaining a count of replaced code fragments in response to removing said old code fragment;
    determining whether said new code fragment is regenerated based on whether said new code fragment has previously been in said software code cache;
    maintaining a count of regenerated code fragments; and
    resizing said software code cache if a ratio of regenerated code fragments to replaced code fragments is beyond a certain threshold.

14. The method of claim 13, further comprising: recording said old code fragment, including setting a flag in a data structure which contains information about entries.

15. The method of claim 13, wherein said eviction policy is a first-in, first out policy.

16. The method of claim 13, wherein said resizing is determined periodically.

17. One or more processor readable storage devices having processor readable code embodied on said processor readable storage devices, said processor readable code for programming one or more processors to perform a method comprising:
    removing an old entry from a cache using an eviction policy after said cache is full;
    adding a new entry to said cache;
    determining whether said new entry was previously in said cache;
    incrementing a count of regenerated entries if said new entry was previously in said cache; and
    resizing said cache based on said count of regenerated entries and a number of removed entries.

18. One or more processor readable storage devices according to claim 17, wherein said resizing includes resizing said cache if a ratio of said count of regenerated entries to said number of removed entries is beyond a threshold.

19. One or more processor readable storage devices according to claim 17, wherein said method further comprises:
    recording said old entry removed from said cache, said recording said old entry includes setting a flag in a data structure which contains information about entries.

20. One or more processor readable storage devices according to claim 17, wherein said old entry and said new entry are code fragments.

21. One or more processor readable storage devices according to claim 17, wherein said eviction policy is a first-in, first out policy.

22. One or more processor readable storage devices according to claim 17, wherein said resizing is determined periodically.

23. One or more processor readable storage devices according to claim 17, wherein said resizing is determined after a predetermined number of entries have been replaced.

24. One or more processor readable storage devices according to claim 17, wherein said cache is a software cache; and said resizing includes resizing said cache if a ratio of said count of regenerated entries to said number of removed entries is beyond a threshold.

25. One or more processor readable storage devices according to claim 17, wherein said cache is a code cache.

26. One or more processor readable storage devices according to claim 17, wherein said cache is a software code cache.

* * * * *